(12) United States Patent
Zuo et al.

(10) Patent No.: US 6,990,816 B1
(45) Date of Patent: Jan. 31, 2006

(54) HYBRID CAPILLARY COOLING APPARATUS

(75) Inventors: Jon Zuo, Lancaster, PA (US); David Sarraf, Elizabethtown, PA (US)

(73) Assignee: Advanced Cooling Technologies, Inc., Lancaster, PA (US)

(*) Notice: Subject to any disclaimer, the term of this patent is extended or adjusted under 35 U.S.C. 154(b) by 0 days.

(21) Appl. No.: 11/022,391

(22) Filed: Dec. 22, 2004

(51) Int. Cl.
*F25B 21/02* (2006.01)

(52) U.S. Cl. .............................. 62/3.7; 62/79; 62/513
(58) Field of Classification Search ............... 62/3.7, 62/79, 318, 512, 513, 515; 165/104.25
See application file for complete search history.

(56) References Cited

U.S. PATENT DOCUMENTS

| | | | |
|---|---|---|---|
| 3,880,230 A * | 4/1975 | Pessolano et al. ..... | 165/104.26 |
| 4,352,392 A | 10/1982 | Eastman | |
| 4,664,177 A | 5/1987 | Edelstein | |
| 5,103,897 A | 4/1992 | Cullimore et al. | |
| 5,725,049 A | 3/1998 | Swanson et al. | |
| 5,816,313 A * | 10/1998 | Baker ............................ | 165/41 |
| 6,058,711 A * | 5/2000 | Maciaszek et al. ........... | 62/3.2 |
| 6,745,830 B2 | 6/2004 | Dinh | |
| 2003/0159808 A1 | 8/2003 | Hoang | |
| 2004/0221579 A1* | 11/2004 | Baker ............................ | 60/670 |

* cited by examiner

*Primary Examiner*—Melvin Jones
(74) *Attorney, Agent, or Firm*—Martin Fruitman

(57) ABSTRACT

The apparatus is a hybrid cooler which includes one loop within which a heated evaporator forms vapor that moves to a condenser because of the vapor pressure which also drives the liquid condensate from the condenser to a liquid reservoir. A second loop is powered by a mechanical pump that supplies liquid from the reservoir to the evaporator and the second loop also returns excess liquid not vaporized to the reservoir. An optional reservoir cooler can be used to assure that the reservoir temperature and vapor pressure are always lower that the temperatures and pressures of the evaporator and condenser.

15 Claims, 6 Drawing Sheets

HYBRID CAPILLARY COOLING APPARATUS

BACKGROUND OF THE INVENTION

This invention deals generally with heat transfer and more particularly with a high performance passive two phase cooling loop that is supplemented by a secondary loop with a mechanical pump for moving liquid to the evaporator and excess liquid back to a reservoir.

Future space and terrestrial systems will depend heavily on thermal management technologies that are capable of high performance in compact configurations that are not presently available and for use in environments that are much harsher than those to which the available technology has been subjected. For example, one proposed pulsed laser communication system has a peak power of 4 kW, and present cooling techniques limit the design to a duty cycle of only 0.025%. Continuing trends of increasing heat generated by such equipment and reduced package size will soon result in the requirement for heat removal capabilities exceeding 100 W/cm$^2$. Furthermore, when used for space vehicles such systems must be very reliable, have low mass, and allow significant flexibility in packaging. Until now, the most suitable available cooling devices have been heat pipes, loop heat pipes, and capillary pumped loops. However, each of those devices has some inherent limitations that make them undesirable for use in the new generation of space and terrestrial systems.

Heat pipes are a relatively mature technology. Aluminum and ammonia heat pipes with axially grooved wicks are the current standard of spacecraft thermal control. Copper and water heat pipes with sintered wicks are commonly used in commercial electronics cooling. The primary advantages of the heat pipe technology are the passive operation and nearly isothermal heat transport. However, the heat transport distance and heat flux capability of a heat pipe is limited by the capillary action in the evaporator wick. Most heat pipes are less than 0.5 meter long and operate against a gravity head of no more than a few inches. Typical grooved wick heat pipes cannot handle heat fluxes above 10 W/cm$^2$. Standard sintered wick heat pipes are capable of removing heat fluxes at up to 75 W/cm$^2$, while heat pipes with specially designed wick structures have been demonstrated to handle heat fluxes as high as 250 W/cm$^2$. However, previously demonstrated high heat flux heat pipes were typically subject to heat sources with areas smaller than 1 cm$^2$. As the heat source area increases, boiling starts inside the wick at the center of the heated area, disrupting the capillary driven liquid flow and eventually causing dryout at the center. This presents a serious hurdle to using heat pipes for applications that require removal of high heat fluxes from large surfaces.

Loop heat pipes and capillary pumped loops are passive, two phase flow heat transfer devices that provide greatly increased heat transport capabilities compared to heat pipes. The use of loop heat pipes and capillary pumped loops in spacecraft thermal control systems has been increasing substantially in the last several years. The main difference between the two devices is the construction and location of the compensation chamber or reservoir. One of the shortcomings of loop heat pipes and capillary pumped loops is the limited heat flux capability. Ammonia loop heat pipes, the most common type, cannot handle heat fluxes above 70 W/cm$^2$. Another shortcoming of the loop heat pipe is the difficulty in accommodating multiple evaporators in one loop. In addition, the evaporator of a loop heat pipe or a capillary pumped loop is limited to a cylindrical configuration with diameters of at least 0.25" for pressure containment and heat leakage reduction. This limits the use of these technologies in compact systems requiring low profile, planar evaporators.

There is a need for more advanced thermal technologies that not only are capable of acquiring, transporting, and dissipating high heat fluxes but also provide substantial mass reduction, reliability improvement and packaging flexibility.

SUMMARY OF THE INVENTION

The present invention is a hybrid cooling loop, a heat transfer apparatus that combines the passive and effective fluid management of capillary structures and the liquid transport capability of a mechanical pump. A hybrid loop consists of two loops. One is a vapor pressure driven two phase loop and the other is a mechanically pumped liquid loop.

The two phase loop includes an evaporator which accepts the heat from a heat input surface that is in contact with the evaporator. The heat evaporates the liquid within the evaporator wick into the vapor space which is adjacent to the wick. A vapor transport line interconnects the vapor space with a condenser that is cooled by an external device, such as a radiator or heat exchanger. The vapor moves through the vapor transport line toward the condenser by virtue of the vapor pressure developed in the evaporator. Since the vapor is at a higher temperature and pressure at the evaporator than at the condenser it constantly moves from the evaporator to the condenser because of the pressure differential. While the evaporation at the evaporator absorbs the heat from the heat input surface, the condensation process rejects the heat to the external cooler. The heat is thereby moved from the evaporator to the remote condenser. In these respects, the present invention is very much like heat pipes and loop heat pipes.

However, the significant difference between hybrid cooling loops and heat pipes and loop heat pipes arises in the mechanisms for returning the condensed liquid from the condenser to the evaporator. Because heat pipes and loop heat pipes use capillary pumps to return the liquid to the evaporator, the distance between the evaporator and condenser and their heat flux capabilities are limited.

The present invention uses a mechanical pump to overcome both of these limitations. The pump is used to supply liquid to the wick in the evaporator in quantities that surpass the amount necessary to support the rate of evaporation in the evaporator. The excess liquid supplied to the wick assures a continuing supply of liquid, but flooding of the wick with liquid is avoided by balancing the pump pressure relative to the vapor pressure generated at the evaporator wick. This balancing is achieved passively by the liquid-vapor menisci at the wick surface. Separated by the menisci, the vapor does not move into the wick, and liquid pressure does not overwhelm the vapor pressure and flood the vapor space. The mechanical pump draws the liquid from a liquid reservoir, through the evaporator, and back to the reservoir in an excess liquid loop that is completely independent of the two phase line between the evaporator and condenser. Moreover, the constant flow of the excess liquid simply moves into the reservoir any vapor bubbles that do enter the liquid stream and do not condense. In hybrid loops, liquid is delivered to the wick either through arteries enclosed within the wick or to a surface of the wick by spray or simple nozzles. When arteries are used the excess liquid simply moves through the arteries and into the reservoir return pipe or into a manifold to which the return pipe is connected.

In one embodiment of the present invention liquid is supplied to the surface of a high flux evaporator wick that includes grooves on the surface of the wick that collect the excess liquid and channel it out of the evaporator and into the reservoir return pipe.

Vapor pressure is also used to drive the movement of condensed liquid from the condenser to the reservoir from which the pump draws the liquid supplied to the evaporator. The reservoir is sub-cooled to a temperature below that of the condenser. This assures that vapor pressure differential between them will move the liquid from the condenser to the reservoir. In one embodiment of the present invention a thermoelectric cooler is used to cool the reservoir by moving heat from the reservoir to the evaporator. The reservoir can also be subcooled by subcooling the liquid in the condenser before it enters the reservoir. Subcooling of the reservoir also allows the pressure differential between the evaporator and the reservoir to drive the excess liquid back to the reservoir.

Other embodiments of the present invention feature a planar evaporator with integrated liquid and vapor manifolds, an integral evaporator and reservoir assembly, and a hybrid loop with multiple evaporators. The present invention thereby provides greater heat transport distances and more robust operations.

DETAILED DESCRIPTION OF THE INVENTION

Figure 1:
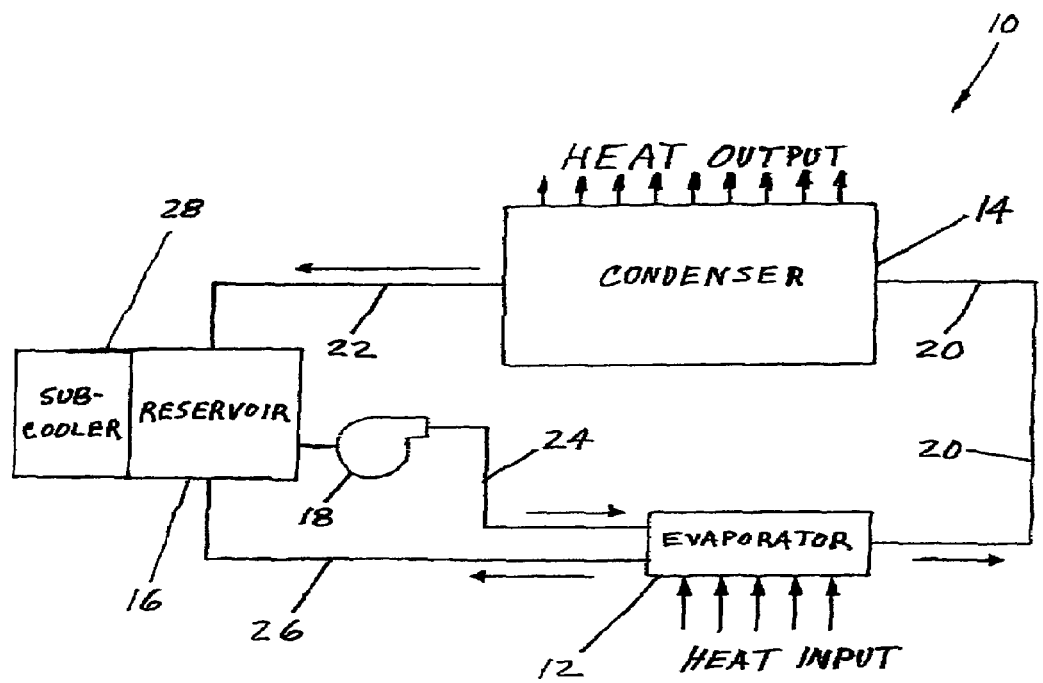
FIG. 1 is a simplified block diagram of a basic hybrid loop cooler.

FIG. 1 is a simplified schematic block diagram of hybrid loop cooler 10 which includes four major components, evaporator 12, condenser 14, liquid reservoir 16, and pump 18. As with any vapor driven heat transfer device, all four components and all the tubing connecting them are sealed from the outside environment, and all non-condensable gases are evacuated from the entire enclosed volume.

In operation of hybrid loop 10 shown in FIG. 1, heat is transferred into evaporator 12, where liquid within an internal wick is vaporized and creates vapor at a pressure which depends upon the temperature of the heat source. The vapor pressure pushes the vapor from evaporator 12 through vapor lines 20 into condenser 14 where the vapor condenses because the temperature of condenser 14 is held down by a heat sink (not shown) that is cooled by an external device such as a radiator or a conduction or convection cooling device. The resulting condensate, the condensed liquid, then moves through condensate return line 22 to reservoir 16 because it is being pushed by the higher vapor pressure within evaporator 12. Pump 18 completes the cycle by overcoming the evaporator's vapor pressure and moving liquid collected in reservoir 16 through liquid supply line 24 and into evaporator 12, while also driving excess liquid from evaporator 12 back to reservoir 16 through return lines 26.

The basic concept of hybrid loop cooler 10 of the present invention is that pump 18 supplies somewhat more liquid to evaporator 12 than is actually required for evaporative cooling in the evaporator, and the capillary pressure in the wick within evaporator 12 collects and transports the excess liquid back to reservoir 16. The internal wick of evaporator 12 is designed so that, within the operating parameters of hybrid loop 10, the vapor pressure being generated and the pump pressure are balanced by the wick capillary pressure so that the pump does not flood the vapor space with liquid, and the vapor pressure being generated does not push vapor into the wick or liquid system. Such calculations are well understood by those skilled in the art of capillary driven devices and depend on the characteristics of the particular fluid, the design of the evaporator wick, and the temperature range of operation of the system.

To meet the conditions of the present invention the design of reservoir 16 must meet several conditions. Reservoir 16 must be large enough to contain the liquid that is displaced from the connecting lines and the condenser. The geometry, location, and internal structure of reservoir 16 must be designed so that pump 18 will always be primed regardless of its orientation or the presence or absence of gravity. However, the size of reservoir 16 should be minimized to reduce the pickup of excess heat from the environment.

The present invention deals with the structure and function of several embodiments of components used in hybrid loop cooler 10 shown in FIG. 1.

One aspect of the present invention is that it can add optional sub-cooler 28 to reservoir 16 to assure that the temperature and vapor pressure of reservoir 16 will be below the temperature and vapor pressure of evaporator 12. Sub-cooler 28 also counteracts heat leakage from the environment and can be used to advantage during startup to establish the required pressure differential during that transient period.

Figure 2:
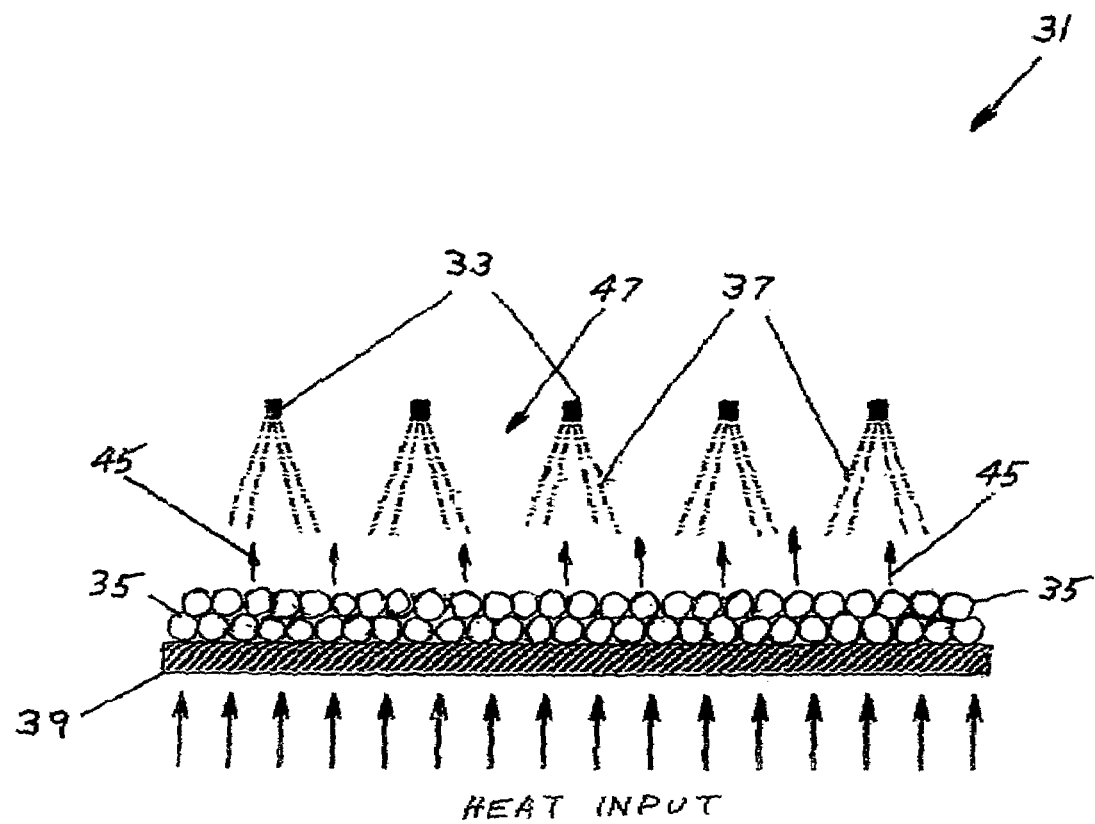
FIG. 2 is a schematic cross section view of the internal structure of the evaporator of one embodiment of the invention with a planar wick.

FIG. 2 is a schematic cross section view of the internal structure 31 of an evaporator of one embodiment of the invention with a planar wick in which one or more liquid sources 33 deliver liquid 37 from pump 18 (FIG. 1) to evaporator wick 35. Since liquid sources 33 need not deliver a fine droplet spray pattern, their delivery openings can be significantly larger than conventional spray nozzles, and they therefore are much less likely to clog up or be subject to erosion. Sub-cooled or saturated liquid 37 is dispensed by liquid sources 33 to wick 35 that is attached to structure 39 which receives the heat input. Capillary forces within wick 35 distribute the liquid throughout wick 35 and particularly to the high heat flux regions within wick 35. Nucleate boiling occurs within wick 35 and evaporation occurs on the porous surfaces of the wick. Vapor 45 is vented into vapor space 47 and subsequently flows toward condenser 14 (FIG. 1) where it rejects latent heat to the heat sink. Excess liquid not evaporated flows through wick 35 and to the reservoir.

Figure 3:
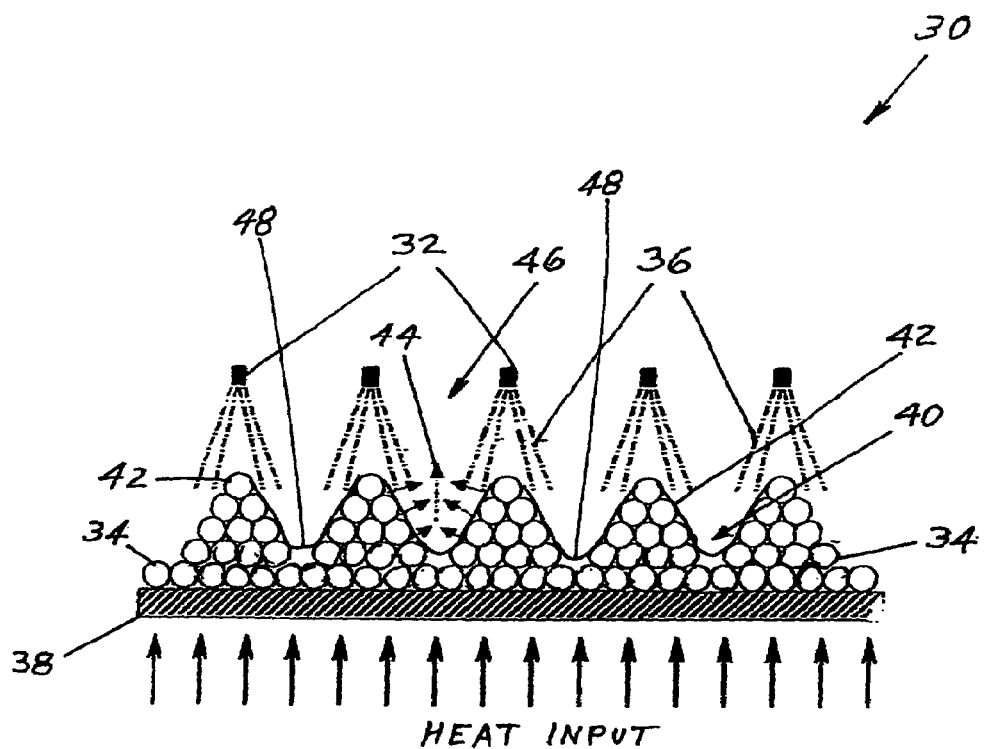
FIG. 3 is a schematic cross section view of the internal structure of the evaporator of another embodiment of the invention with a grooved wick.

FIG. 3 is a schematic cross section view of another embodiment 30 of the internal structure of an evaporator of the invention. Wick 34 is constructed with multiple grooves 40 and porous lands 42 between grooves 40. As described in regard to FIG. 2 one or more liquid sources 32 deliver liquid 36 from pump 18 (FIG. 1) to evaporator wick 34. Nucleate boiling occurs within the porous lands 42 and evaporation occurs on the porous surfaces of lands 42. Vapor 44 is vented into grooves 40 and into vapor space 46 and subsequently flows toward condenser 14 (FIG. 1) where it is transferred to the heat sink. Menisci developed on the porous surfaces of lands 42 and separate the liquid inside the wick from the vapor, and the radii of the self adjusting menisci change according to variations in the liquid and vapor pressures, thus maintaining the phase separation.

Grooves 40 serve two critical functions. They provide low resistance venting paths for vapor 44 generated within porous lands 42. The grooves also collect excess liquid 48 and allow it to flow to the liquid outlet in the bottom portions of the grooves. It should be noted that the grooves can be made in various shapes including triangular as shown in FIG. 3, trapezoidal, rectangular, and other shapes to suit different applications.

Figure 4:
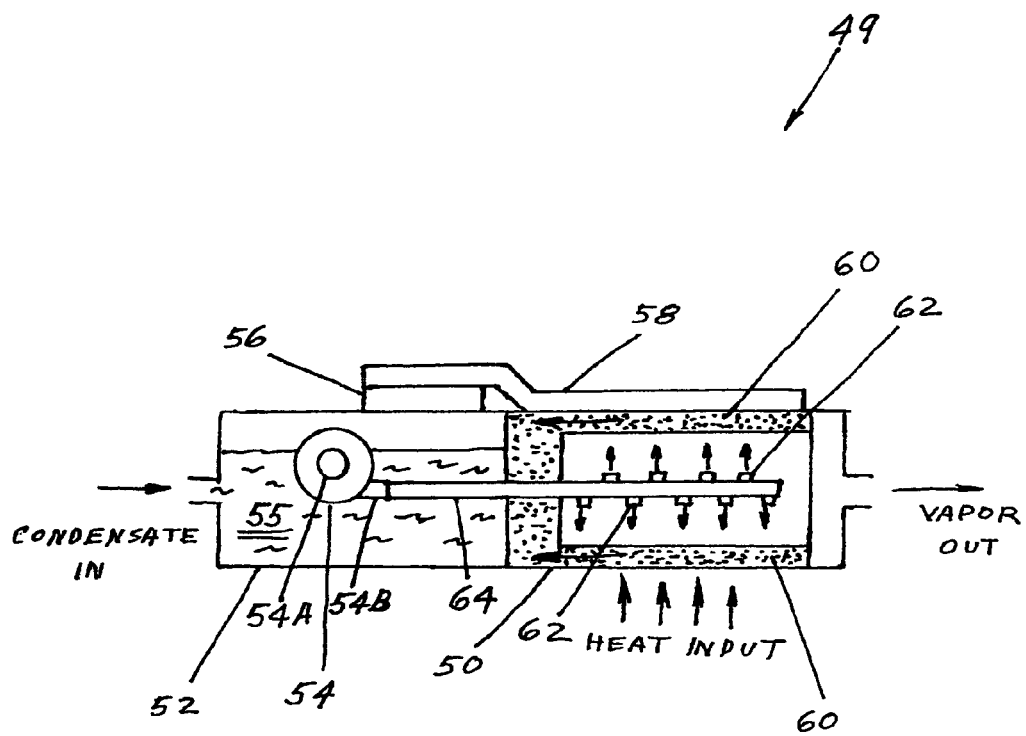
FIG. 4 is a schematic cross section view of a fully integrated evaporator and reservoir with thermoelectric cooling of the reservoir.

FIG. 4 is a schematic cross section view of fully integrated cylindrical loop cooler assembly 49 with evaporator 50, reservoir 52, pump 54, and thermoelectric cooler 56 sub-cooling reservoir 52. Thermoelectric cooler 56 transfers heat from reservoir 52 to evaporator 50 through conventional heat pipe 58. It should be appreciated that such heat transfer can be accomplished by other means such as a solid metal conductor or another heat transfer device.

Assembly 49 operates in the same manner described above in regard to hybrid loop cooler 10 of FIG. 1, but the essential difference is the integrated structure that eliminates the interconnecting lines for delivery of liquid and excess liquid return. Liquid is delivered to wick 60 directly from pump 54 by liquid sources 62 that can be as simple as holes in delivery pipe 64. Excess liquid moves directly through wick 60 of evaporator 50 and into reservoir 52. There is no physical barrier between evaporator 50 and reservoir 52 because when assembly 49 is operating, the vapor pressure difference between evaporator 50 and reservoir 52 is sufficient to prevent liquid from flooding the vapor space within evaporator 50. Both the inlet 54A and outlet 54B of pump 54 are immersed in liquid 55 within reservoir 52, including when the liquid is at its minimum volume, which assures that pump 54 will be primed at all times.

Figure 5:
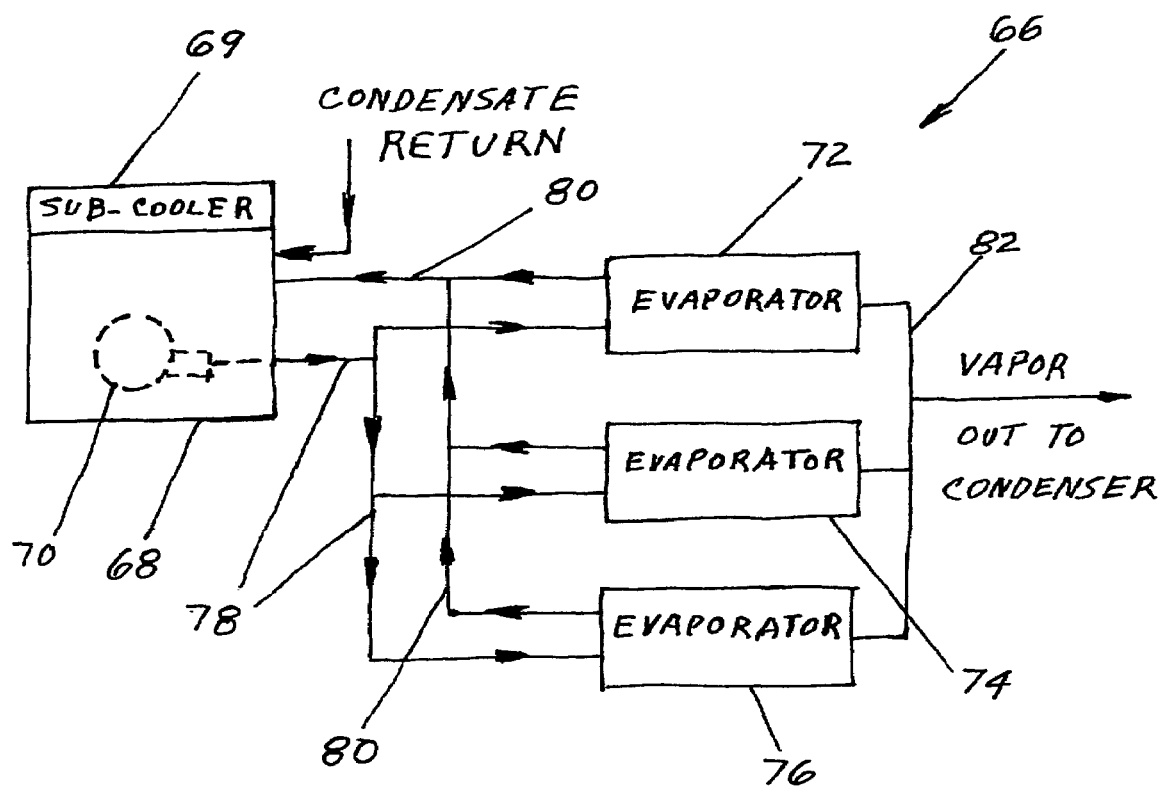
FIG. 5 is a simplified block diagram of an embodiment of the invention in which several evaporators are interconnected with a single reservoir.

FIG. 5 is a simplified block diagram of an embodiment of the invention in which several evaporators are interconnected with a single reservoir. Hybrid loop cooler assembly 66 of FIG. 5 uses a single reservoir 68 cooled by thermoelectric cooler 69 and a single pump 70 to supply liquid to evaporators 72, 74, and 76 that are in parallel legs of assembly 66, however, a single pump and reservoir can also be used to supply evaporators connected in series flow. All three evaporators are supplied with liquid from liquid supply manifold 78, and the excess liquid is returned to reservoir 68 from all the evaporators through excess liquid return manifold 80. Vapor is delivered to the condenser (not shown) through vapor manifold 82, and the condensate from the condenser returns to reservoir 68 conventionally as shown in FIG. 1.

This configuration demonstrates the ability of the hybrid loop cooler to accomplish a task that is difficult or impossible for a heat loop that is solely dependent on the capillary pumping of an evaporator wick. Not only can the present invention permit locating the reservoir either close to or remote from the evaporator, but because of the use of a mechanical pump only the hybrid loop cooler is capable of using one remote reservoir and one pump to supply multiple evaporators. It should also be appreciated that hybrid loop cooler assembly 66 is not limited to only three evaporators and that multiple evaporators maintain isothermal conditions among the heat sources of the multiple evaporators.

Furthermore, multiple integrated evaporator-reservoir-pump assemblies as shown in FIG. 4 can also be used with a single condenser in a configuration similar to that shown in FIG. 5.

Figure 6:
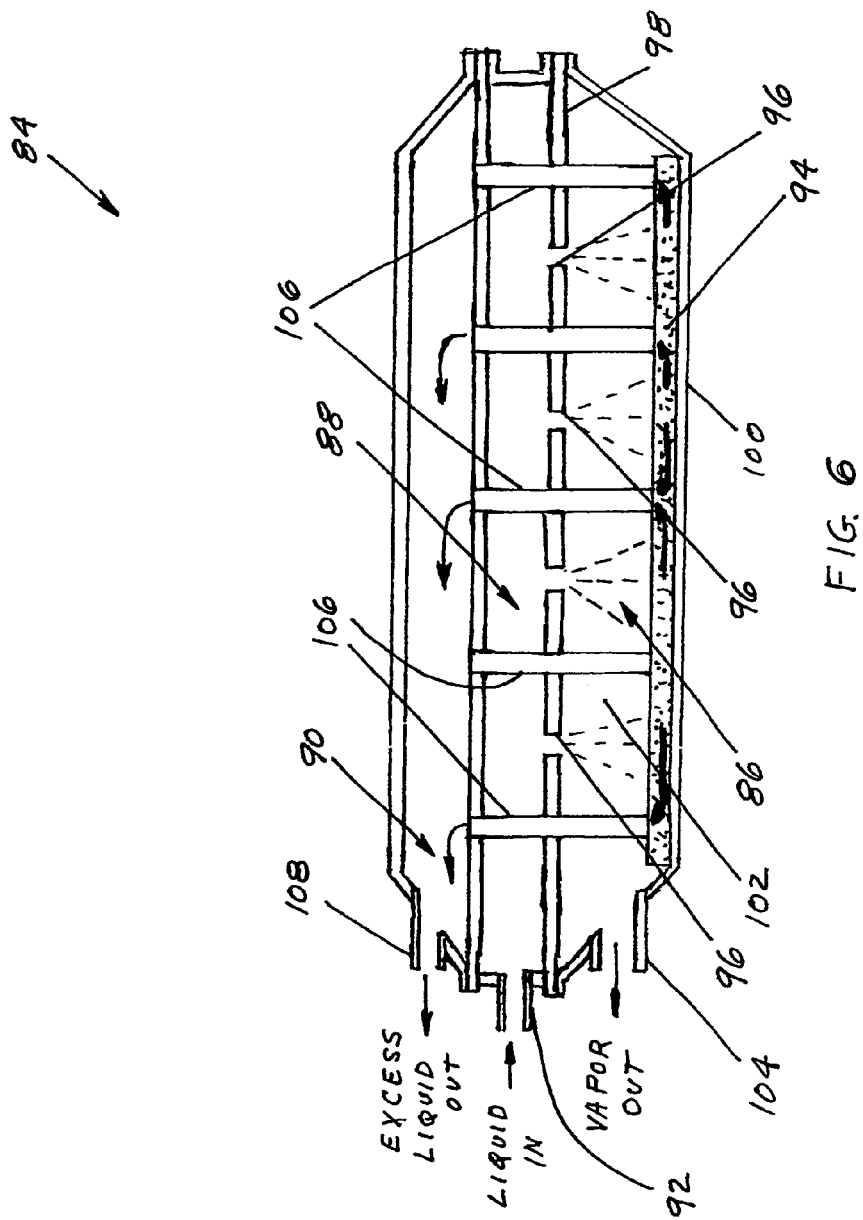
FIG. 6 is a partial cross section side view of another embodiment of the invention with a planar evaporator with integrated liquid and vapor chambers.

FIG. 6 is a partial cross section side view of planar evaporator assembly 84 in which evaporator 86 is integrated with input liquid chamber 88 and excess liquid chamber 90. Planar assembly 84 operates in the same manner as the other evaporators previously described. Liquid pumped from a reservoir (not shown in FIG. 6) enters input liquid chamber 88 at liquid inlet 92 and is delivered to wick 94 through liquid sources 96, which are shown as simple holes in separation wall 98, but could also be nozzles or some other configuration. Wick 94 is heated by heat applied to heat input surface 100, and wick 94 generates vapor that enters vapor space 102 and moves out through vapor outlet 104 to a condenser (not shown) because of the vapor pressure developed within vapor space 102. The vapor pressure also propels excess liquid from wick 94 up through excess liquid tubes 106 from multiple locations on planar wick 94 and into excess liquid chamber 90. The excess liquid then moves through excess liquid outlet 108 to a reservoir (not shown) by the pressure differential between vapor space 102 and the reservoir. This pressure differential is developed by sub-cooling the reservoir.

Planar evaporator assembly 84 thereby furnishes a compact evaporator and manifold apparatus the can be used in many applications where traditional cylindrical configurations would be impractical. It is also important to appreciate that a planar evaporator can also be constructed with an integral pump and reservoir as shown in FIG. 4.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, nontraditional materials can be used for the invention, such as titanium and water for higher temperature ranges than are available from the commonly used aluminum and ammonia.

What is claimed is:

1. A cooling apparatus comprising;
    at least one evaporator comprising an enclosure from which all non-condensable gases have been evacuated, the enclosure including a capillary wick in contact with an interior surface receiving heat from means external to the evaporator, a vapor space for receiving vapor evaporating from the wick, a liquid inlet admitting liquid into the enclosure, at least one liquid source supplying liquid to a surface of the wick, an excess liquid outlet for removing excess liquid from the enclosure, and a vapor outlet accessible to the vapor space for removing vapor from the enclosure;
    a condenser comprising an enclosure, a vapor inlet interconnected with the evaporator vapor outlet by a vapor transporting structure, an interior surface cooled by a means external to the enclosure, and a condensate outlet removing liquid condensed within the enclosure;
    a reservoir comprising an enclosure holding liquid, a condensate inlet interconnected with the condensate outlet of the condenser by a liquid transporting structure, a liquid outlet interconnected with the evaporator liquid input by a liquid transporting structure, and an excess liquid inlet interconnected with the excess liquid outlet of the evaporator by a liquid transporting structure; and a pump interconnected with the reservoir and the evaporator and moving liquid to the evaporator from the reservoir.

2. The cooling apparatus of claim 1 further including a sub-cooler maintaining the reservoir at a temperature and a vapor pressure below the temperatures and the vapor pressures of the evaporator and the condenser.

3. The cooling apparatus of claim 1 further including a sub-cooler attached to the reservoir and maintaining the reservoir at a temperature and a vapor pressure below the temperatures and the vapor pressures of the evaporator and the condenser.

4. The cooling apparatus of claim 1 further including a sub-cooler attached to the reservoir and maintaining the reservoir at a temperature and a vapor pressure below the temperatures and the vapor pressures of the evaporator and the condenser wherein the sub-cooler is a thermoelectric cooler.

5. The cooling apparatus of claim 1 further including a sub-cooler maintaining the condenser at a temperature and a vapor pressure below the temperature and the vapor pressure of the evaporator.

6. The cooling apparatus of claim 1 wherein the evaporator wick comprises a porous structure that functions as a phase separator.

7. The cooling apparatus of claim 1 wherein the evaporator wick comprises a porous structure with grooves and the surfaces of the grooves are made of porous material.

8. The cooling apparatus of claim 1 wherein the evaporator wick comprises a porous structure with grooves and the grooves collect excess liquid.

9. The cooling apparatus of claim 1 wherein the evaporator wick comprises a porous structure with lands and grooves, the surfaces of the grooves are made of porous material, and the cross section of the lands has a triangular shape.

10. The cooling apparatus of claim 1 wherein the evaporator, the reservoir, and the pump are enclosed within a single structure.

11. The cooling apparatus of claim 1 wherein the evaporator, the reservoir, and the pump are enclosed within a single structure and a sub-cooler cools the reservoir, with the sub-cooler being a thermoelectric cooler and a heat transfer device moves heat from the thermoelectric cooler to the evaporator.

12. The cooling apparatus of claim 1 wherein the pump is located within the reservoir and the pump input and output are immersed in the liquid.

13. The cooling apparatus of claim 1 wherein there are multiple evaporators and the evaporators have a common vapor manifold, a common liquid supply manifold, and a common excess liquid return manifold.

14. The cooling apparatus of claim 1 wherein the evaporator is constructed as a planar structure.

15. The cooling apparatus of claim 1 wherein the evaporator is constructed as a planar structure with at least one liquid source supplying liquid to a planar wick from an input liquid chamber and with an excess liquid chamber collecting excess liquid from at least one location on the wick.

* * * * *